H. B. SHERMAN.
HOSE CLAMP.
APPLICATION FILED DEC. 23, 1918.
1,317,326. Patented Sept. 30, 1919.
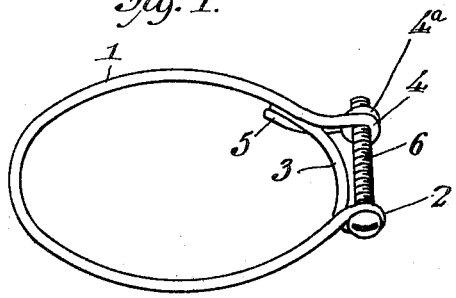
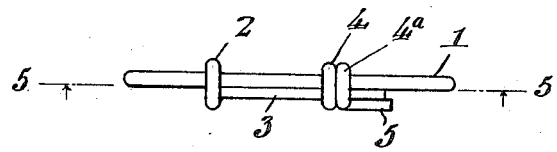
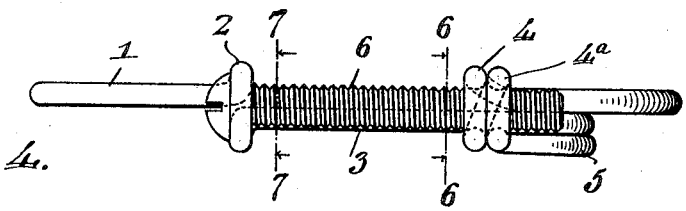
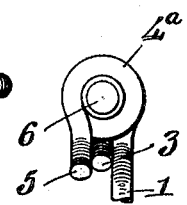
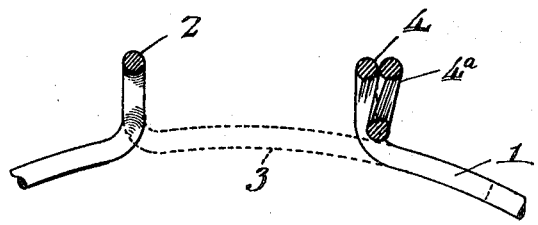
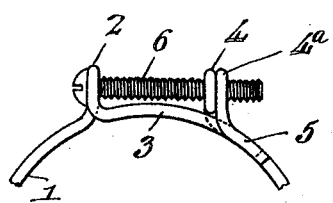
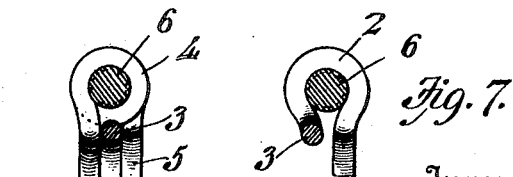

UNITED STATES PATENT OFFICE.

HOWARD B. SHERMAN, OF BATTLE CREEK, MICHIGAN.

HOSE-CLAMP.

1,317,326.  Specification of Letters Patent. Patented Sept. 30, 1919.

Application filed December 23, 1918. Serial No. 268,011.

*To all whom it may concern:*

Be it known that I, HOWARD B. SHERMAN, a citizen of the United States, residing at Battle Creek, in the county of Calhoun and State of Michigan, have invented certain new and useful Improvements in Hose-Clamps; and I hereby declare that the following is a full, clear, and exact description thereof, reference being had to the accompanying drawings, which form part of this specification.

This invention is an improvement in hose clamps, and its object is to produce a hose clamp formed preferably of a single continuous piece of wire bent to form the circular single strand body of the clamp having an opening at one side; and one end of the wire bent to form an eye or loop for the passage of the shank of the fastening bolt, and also a tongue adapted to extend from such eye or loop across the opening in the clamp (or across the space between the opposite ends of the body of the clamp); and the other end of the wire being bent into a close coil or coils, opposite the first mentioned eye or loop, said coil or coils being preferably internally threaded to engage the threaded shank of the fastening bolt; and the short extremity of the coiled end of the wire being bent backward, parallel with the body of the clamp, to form with the adjacent end of the body a guide or retainer for the free end of the tongue.

The invention provides a very simple strong and efficient clamp, and I will explain the same with reference to the accompanying drawings which illustrate a clamp embodying the invention; and in the claims appended to the description I have summarized the essentials and novel features of construction of the clamp for which protection is desired.

In the drawings:

Figure 1 is a perspective view of a wire hose clamp embodying the invention.

Fig. 2 is a top plan view thereof with the fastening bolt removed.

Fig. 3 is a side view of the upper part of the clamp with the bolt in position.

Fig. 4 is an enlarged top plan view of the clamp with the bolt in place.

Fig. 5 is an enlarged detail longitudinal sectional view, on line 5—5, Fig. 2.

Fig. 6 is a detail transverse sectional view on line 6—6, Fig. 4.

Fig. 7 is a similar view on line 7—7, Fig. 4.

Fig. 8 is a right hand end view of Fig. 4.

The clamp, as shown, is formed of a continuous length of stout wire, varying in gage according to the size of the clamp and the power or pressure it is desired to exert thereby. This wire is bent upon itself to form the approximately circular single strand body portion 1 of the clamp.

At one end of the body portion the wire is bent into an eye or loop 2 projecting outwardly from the body portion and disposed approximately in a plane at right angles to the plane of the body and radially of the circle formed by the body portion. This eye 2 is adapted to be engaged by the headed end of the fastening bolt 6, the threaded shank of which transfixes or passes through such eye as shown.

The extremity of this end of the wire is extended beyond the eye 2 to form a tongue 3 which lies in approximately the plane of the body portion and is adapted to bridge the space between the opposite ends of the body portion and to close the gap or opening therebetween when the clamp is applied to an object, and said tongue forms with the body portion a continuous circle of metal around the object to which the clamp is applied.

The other end of the wire is also bent into a coil or coils, two being shown at 4 and 4ª, which coils are formed very close together and in axial alinement, the coil 4 being opposite the eye 2 and coil 4ª exterior to coil 4 but in axial alinement therewith and close thereto; and said coils are disposed at right angles to the plane of the body portion, and project radially outward therefrom. Said coils are so arranged that when the clamp is applied they are opposite and approximately parallel with the eye 2 and in axial alinement therewith.

The coils 4, 4ª may be welded together if desired and are preferably made of smaller internal diameter than the shank of the bolt 6, and are internally threaded, as shown, to engage the exterior threads of the shank of the bolt, the said coils so formed and threaded constituting a nut for engagement with the bolt and enabling the usual nut for retaining the bolt to be dispensed with; although, if desired, a nut might be also used on the shank at the outer end of the coils, but I prefer to provide a sufficient number of coils and make them sufficiently close and rigid so that when internally threaded they will afford all the hold required to positively engage and secure the bolt shank.

The extremity of the wire forming coils 4, 4ᵃ is bent backward from the outermost coil to form a short finger 5, that extends parallel with and beside the adjacent part of the body of the shank and forms therewith a guide or retainer for the fee end of the tongue 3, as shown.

A clamp so constructed is simple, efficient, and compact, and possesses the following practical advantages: It economizes wire; dispenses with the use of a separate nut; the thread is cut in the double coil; the finger extending from this coil provides a guide for the tongue; and all parts of the clamp are integral. It is a simple form of wire clamp that can be made with a bolt. It has all the essentials necessary to form a complete circle around an object to which it is applied; and the bolt sets close enough to the top of the tongue to prevent the tongue buckling, should it tend to, which would only occur in the case of extreme tension or very hard usage.

What I claim is:

1. A hose clamp formed of a single piece of wire bent to form a single strand body portion having an opening at one side; one end of the wire being bent to form an eye at one side of the opening lying in a plane at right angles to the body portion, the adjacent extremity of the wire extending as a tongue from said eye across the opening; the opposite end of the wire being bent into a coil lying in a plane at right angles to the body portion and opposite the eye.

2. A hose clamp formed of a single piece of wire bent to form a body portion having an opening at one side; one end of the wire being bent to form an eye at one side of the opening lying in a plane at right angles to the body portion, the adjacent extremity of the wire extending as a tongue from said eye across the opening; the opposite end of the wire being bent into a coil lying in a plane at right angles to the body portion and opposite the eye and its extremity being extended from said coil to form a finger to guide the free end of the tongue when the clamp is applied.

3. A hose clamp formed of wire having a single strand body portion with an opening at one side; the wire being bent at one side of the opening to form an eye, said eye projecting radially of the body portion and in a plane at right angles thereto; the adjacent extremity of the wire extending as a tongue from said eye across the opening; the wire at the opposite side of the opening being bent into a coil lying in a plane at right angles to the body portion and projecting radially outwardly therefrom opposite the eye; said coil being internally threaded; and a bolt transfixing the eye, the threaded shank of the bolt engaging the internal threads of the coil.

4. A hose clamp formed of wire having a body portion with an opening at one side; the wire being bent at one side of the opening to form an eye, said eye projecting radially of the body portion and in a plane at right angles thereto, the adjacent extremity of the wire extending as a tongue from said eye across the opening; the wire at the opposite side of the opening being bent into a coil lying in a plane at right angles to the body portion and projecting radially outwardly therefrom opposite the eye; said coil being internally threaded and the adjacent extremity of the wire being extended from said coil beside the adjacent part of the body to form a guide finger to guide the free end of the tongue when the clamp is applied; and a bolt transfixing the eye, the threaded shank of the bolt engaging the internal threads of the coil.

5. A hose clamp formed of a single piece of wire bent to form a body portion having an opening at one side; one end of the wire at one side of the opening being bent to form an eye projecting radially of the body portion and in a plane at right angles thereto, the adjacent extremity of the wire extending as a tongue from said eye across the opening; the opposite end of the wire being bent into a plurality of closely adjacent axially alined coils, the first or inner coil being opposite the eye and the other coils beside but exterior to the first coil, said coils lying in a plane at right angles to the body portion and projecting radially outwardly therefrom opposite the eye and being internally threaded, substantially as described.

In testimony that I claim the foregoing as my own, I affix my signature.

HOWARD B. SHERMAN.